United States Patent
Chang et al.

(10) Patent No.: US 8,605,404 B2
(45) Date of Patent: *Dec. 10, 2013

(54) CASCADE ELECTROMAGNETIC PULSE PROTECTION CIRCUIT FOR HIGH FREQUENCY APPLICATION

(75) Inventors: Liann-Be Chang, Tao-Yuan (TW); Jiun Yuh Chen, Tao-Yuan (TW)

(73) Assignee: Chang Gung University, Tao-Yuan (TW)

(*) Notice: Subject to any disclaimer, the term of this patent is extended or adjusted under 35 U.S.C. 154(b) by 320 days.

This patent is subject to a terminal disclaimer.

(21) Appl. No.: 13/155,455

(22) Filed: Jun. 8, 2011

(65) Prior Publication Data

US 2011/0242719 A1     Oct. 6, 2011

Related U.S. Application Data

(63) Continuation-in-part of application No. 12/134,235, filed on Jun. 6, 2008, now abandoned.

(51) Int. Cl.
*H02H 9/00* (2006.01)

(52) U.S. Cl.
USPC ........................................... 361/111

(58) Field of Classification Search
USPC ................................. 361/91.1, 111
See application file for complete search history.

(56) References Cited

U.S. PATENT DOCUMENTS

| | | | |
|---|---|---|---|
| 6,222,282 B1 | 4/2001 | Rossi et al. | |
| 6,586,272 B1* | 7/2003 | Song | 438/94 |
| 6,944,435 B2 | 9/2005 | Contopanagos et al. | |
| 7,268,027 B2* | 9/2007 | Kwon et al. | 438/172 |
| 7,990,665 B2* | 8/2011 | Chang et al. | 361/56 |
| 8,120,014 B2* | 2/2012 | Nabet et al. | 257/21 |
| 2001/0036050 A1 | 11/2001 | Lee et al. | |
| 2005/0179113 A1 | 8/2005 | Kim et al. | |

* cited by examiner

*Primary Examiner* — Stephen W Jackson
(74) *Attorney, Agent, or Firm* — Ming Chow; Sinorica, LLC

(57) ABSTRACT

The present invention discloses a cascade EMP protection circuit, which comprises an LEMP protection circuit and a fast-response protection circuit, wherein a symmetric capacitive varactor element is cascaded to the path of signal transmission. Thereby, the present invention can protect electronic devices against LEMP or EMP released by an electronic weapon (NEMP, HEMP, or PEMP).

8 Claims, 6 Drawing Sheets

CASCADE ELECTROMAGNETIC PULSE PROTECTION CIRCUIT FOR HIGH FREQUENCY APPLICATION

The present invention is a continuous-in-part application of the application that is entitled "CASCADE ELECTROMAGNETIC PULSE PROTECTION CIRCUIT" (Application NO.: U.S. Ser. No. 12/134,235) filed on Jun. 6, 2008 now abandoned, which is filed presently with the U.S. Patent & Trademark Office, and which is used herein for reference in its entirety.

BACKGROUND OF THE INVENTION

1. Field of the Invention

The present invention relates to a cascade electromagnetic pulse protection circuit for high frequency application, which can inhibit the fast or slow overvoltage surge induced by EMP (Electromagnetic Pulse).

2. Description of the Related Art

Electromagnetic weapons may be classified into the NEMP (Nuclear Electromagnetic Pulse) bomb, the HEMP (High-altitude Electromagnetic Pulse) bomb, the PEMP (Portable Electromagnetic Pulse) weapon. The NEMP bomb has an affected area with a radius of hundreds of kilometers. As a nuclear explosion can damage so vast an area and will cause so intense an international reaction, it is very unlikely to be directly used in the future war. Besides, the NEMP bomb may also damage our own communication systems and monitoring systems. The EMP warhead carried by a long-range missile has a medium affected area with a radius of tens of kilometers. The PEMP weapon, which is a small-size bomb carried by a human being or a small-size carrier, and has an affected area with a radius of less than one kilometer. In the long run, EMP bombs must be one of the weapons used in war.

The explosion of an EMP weapon will generate a pulse of a very high strength electric field characterized in that the electric field strength rises so quickly that the maximum strength is reached within 10 nanoseconds, and that the electric field strength generated by the EMP weapon explosion is higher that that of an LEMP (Lightning Electromagnetic Pulse) and is between 50 and 100 KV/m. The fast rising of so intense an electric field strength will induce a current as great as thousands of amperes in an antenna or a longer cable. Because of so fast a strength rising rate, so high a voltage and so great a current, general lightning arresters are unlikely to protect electronic devices against the damage caused by an EMP weapon explosion.

When an EMP rushes into a communication/information device, it may induce a voltage as high as from 10 to 150 kV. If there is none protection circuit, the front end electronic elements are unlikely to tolerate such a high voltage. Currently, communication electronic devices generally have so-called lightning arresting devices, which are usually low-speed LEMP protection elements formed of spark gap switches or zinc oxide elements. As the LEMP protection element operates slowly, it has a long response time and a higher clamping voltage.

For current LEMP protection elements, the EMP inhibition effect is determined by the response time. As the spark gap switches or zinc oxide elements have a longer response time, they will not inhibit EMP until the surge voltage has been very high. Therefore, the current LEMP protection elements cannot protect an electronic device against a fast-rising EMP electric field.

IC (Integrated Circuit) generally has a high-speed ESD (Electrostatic Discharge) protection element (usually TVS (Transient Voltage Suppressor), DIAC (Diode for Alternating Current), MOV (Metal Oxide Varistor), etc.) at the front end. The high-speed ESD protection element can respond very fast and can tolerate a voltage as high as 8000V. However, the high-speed ESD protection element is not a high current tolerant element. The electromagnetic pulse of a lightning or an EMP bomb has a greater pulse width. A longtime overvoltage induces a current effect and generates a large amount of heat, which will firstly burns out the high-speed ESD protection element and then burns out the internal structures of IC. Therefore, a high-speed ESD protection element can only withstand electrostatic discharge but cannot tolerate high-energy EMP attacks.

Generally, a communication device has a lightning arresting device (LEMP protection element), and an IC has an ESD protection element at the front end thereof. However, even parallel connecting an LEMP protection element and an ESD protection element cannot yet solve the abovementioned problem. Current will firstly flow through the high-speed ESD protection element, which turns on fast but cannot tolerate high current, until it burns out. Then, the voltage rises again. The front end IC maybe has burned out before the LEMP protection element starts to operate. Besides, as all high-speed protection elements are capacitive elements, they will result in the insertion loss of communication/information devices and affect communication distance.

A Taiwan patent No. 588888, which was filed by the Inventors on Sep. 24, 2002, disclosed a method to solve the abovementioned problem, wherein a rear stage ESD protection element is triggered firstly, and the potential is established on a cascaded resistor, and then a front stage high-power LEMP protection element is triggered reversely. Thus, the charge following can be drained out, and the entire system is protected. Besides, the insertion loss of input signal is also compensated. However, the conventional technology still has the problem of insertion capacitance, which is shunt to the ground and likely to cause high-frequency loss. In applications that the frequency is higher than 1 GHz, if the small-capacitive MOV or TVS elements are adopted; thus, the current draining capacity is also smaller, and the EMP impact on the performance of electronic devices cannot be effectively reduced. For low-frequency applications, the conventional technology still has other problems to be solved. For an electric field strength higher than 300 KV/m, the conventional technology still has room to improve.

SUMMARY OF THE INVENTION

The primary objective of the present invention is to provide a novel cascade EMP (Electromagnetic Pulse) protection circuit for high frequency application to solve the abovementioned problems, wherein the insertion loss of a fast-response protection element (or ESD element) is further blocked, or the structure of a fast-response protection circuit is modified, in which varactors are cascaded to signal paths (not shunt to the ground) to effectively protect electronic devices against the damage caused by EMP.

The present invention discloses a cascade EMP protection circuit for high frequency application, which integrates an LEMP protection circuit with a new type fast-response protection circuit, wherein in the fast-response protection circuit, EDS elements are self-cascaded to reduce insertion loss; alternatively, inductive elements are shunted to the ground to save EDS elements at a higher frequency operation and form a high-pass circuit. A capacitive-reactance element is cascaded to the circuit, wherein the capacitive-reactance element is a varactor having a capacitance varying with the input voltage. The varactor normally has a high symmetrical capacitance and a low impedance, which allows the RF signal can transmit to the next device without any distortion. When an intense overvoltage EMP appears, the varactor has a low capacitance and a high impedance, which impedes surge coupling and thus protect electronic elements from the damage of a surge pulse.

Alternatively, in the cascade EMP protection circuit disclosed by the present, an impedance element can be used to integrate an EMP protection circuit and a fast-response protection circuit, wherein the fast-response protection circuit can be self-cascaded or cascaded to a compensation element; further, the fast-response protection circuit together with the EMP protection circuit is further cascaded by a capacitive-reactance element, which may be the varactor mentioned above. Thereby, the present invention can protect electronic devices against EMP damage.

Below, several embodiments are described in detail to further demonstrate the present invention.

DETAILED DESCRIPTION OF THE INVENTION

The present invention proposes a cascade EMP protection circuit for high frequency application, wherein a fast-response protection circuit is integrated with an LEMP protection circuit, and a new architecture is applied to a communication system, whereby the present invention not only can prevent from a common lightning damage but also can protect against various sudden EMP attacks. Besides, insertion loss is also blocked. Thus, the present invention can apply to higher frequency cases and can tolerate/inhibit a higher energy surge.

Figure 5:
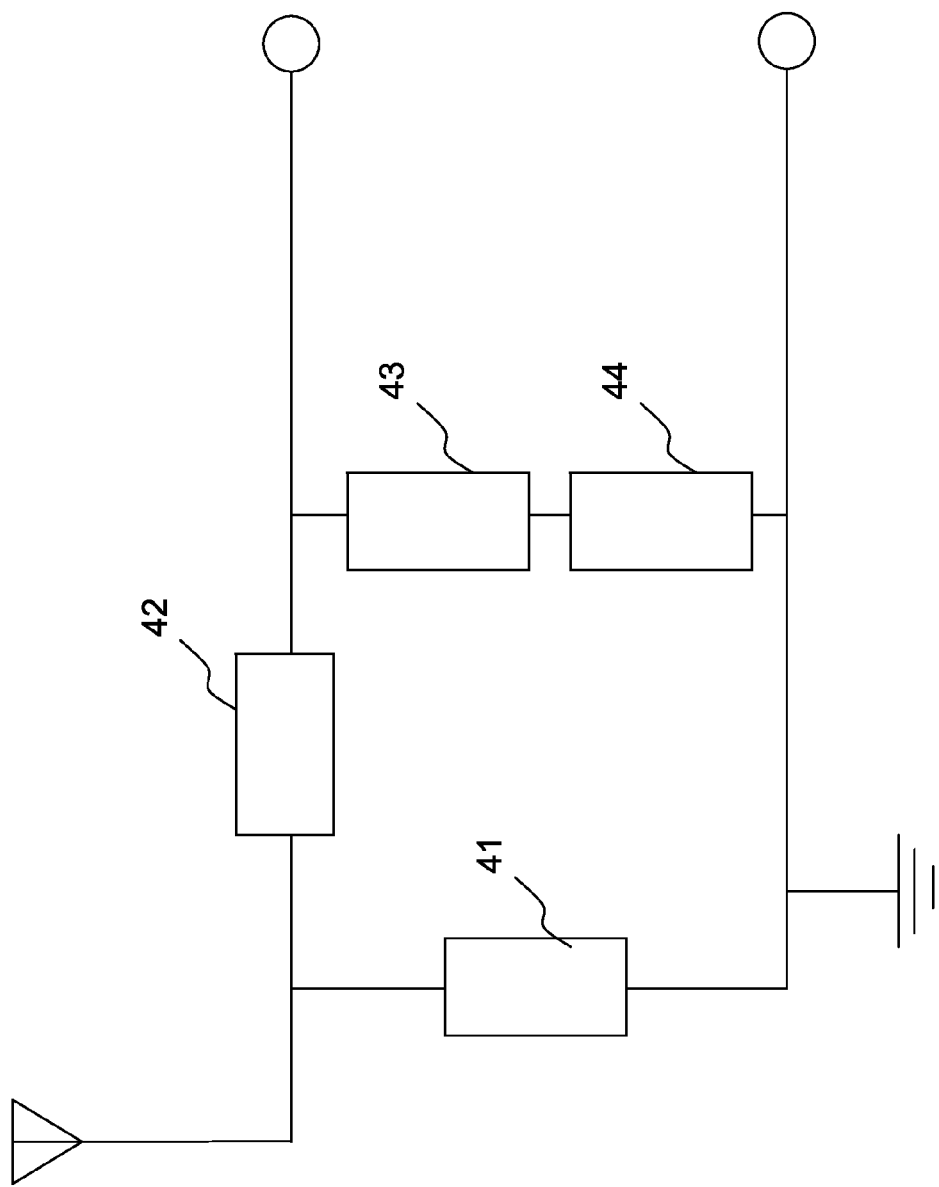
FIG. 5 is a block diagram schematically showing a conventional EMP protection circuit.

Refer to FIG. 5 for a conventional EMP protection circuit, wherein a fast-response protection element 43 and an LEMP protection element 41 are integrated by an impedance element 42, and an insertion-loss compensation element 44 is cascaded to the fast-response protection element 43. A fast-response protection element generally has capacitance; therefore, a fast-response protection element usually causes an insertion loss when it applies to a high-frequency communication device. Further, insertion loss rises with the increase of frequency. In conventional technologies, an inductive compensation element 44 is cascaded to the fast-response element 43 to compensate frequency. For example, in the Taiwan patent No. 588888 the Inventors filed on Sep. 24, 2002, the fast-response element may be a semiconductor element (TVS or DIAC) or a zinc oxide element (MOV); therefore, the fast-response protection element itself is a capacitive element and may function as a low-pass filter and can drain surge energy when a voltage surge of thousands of volts attacks. However, the conventional technologies have an inferior draining of sudden surges at a medium frequency because there is an inductor existing. At a higher frequency, the combination of the fast-response protection element 43 and the inductive compensation element 44 will create a retard effect and impair broadband frequency-hopping applications.

Figure 1:
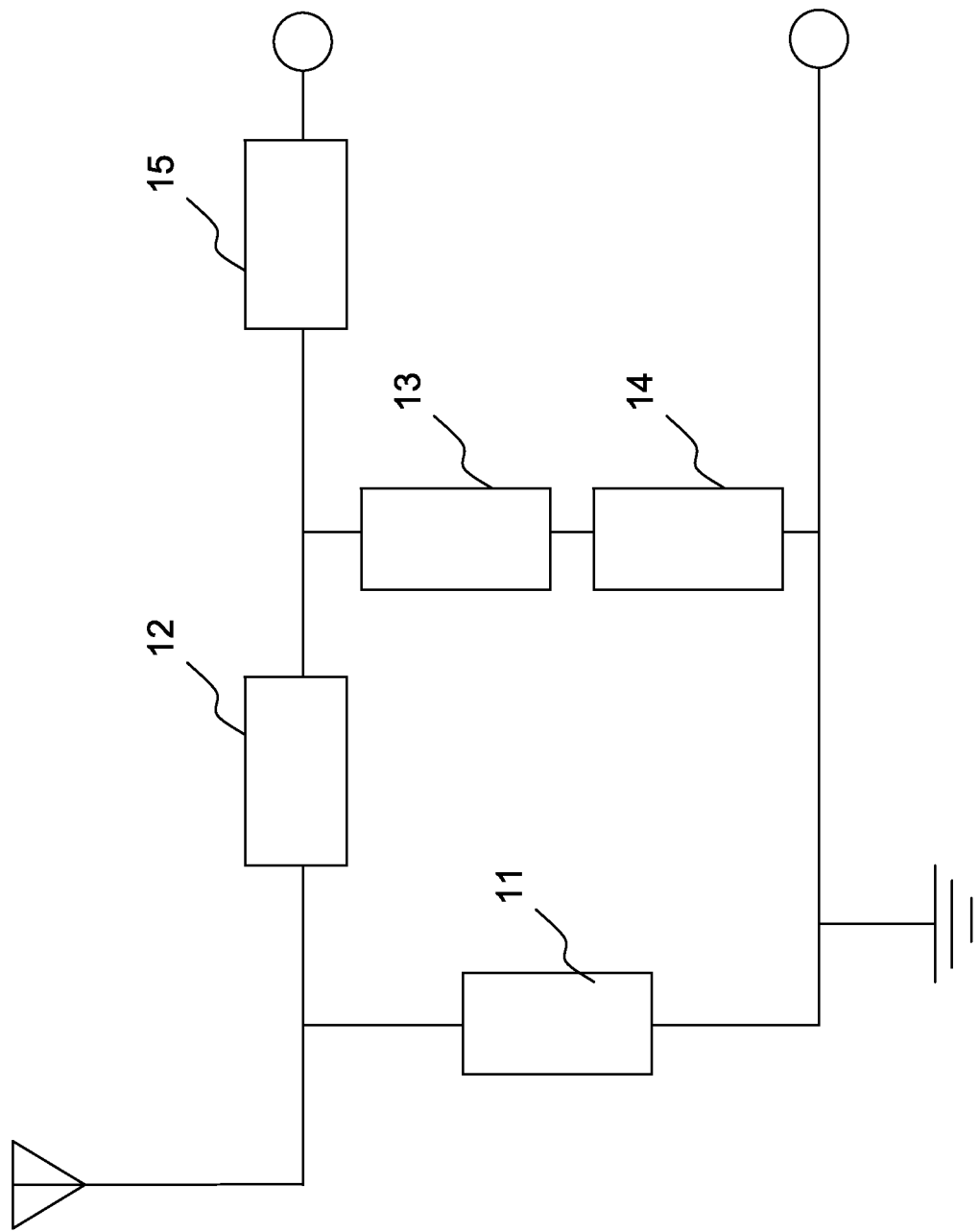
FIG. 1 is a block diagram schematically showing a cascade EMP protection circuit according to a first embodiment of the present invention.

Refer to FIG. 1 for an EMP protection circuit according to a first embodiment of the present invention. In this embodiment, a fast-response protection element 13 and an LEMP protection element 11 are integrated by an impedance element 12. In medium-frequency applications, a fast-response protection 14 is cascaded to the fast-response protection element 13 to perform compensation. As the capacitance is decreased by the cascade of the fast-response protection elements 13 and 14, the insertion loss is also reduced. A fuse 15 may be added to prevent from an induction event caused by that the antenna contacts a naked power cable and burns the whole circuit down.

Figure 2:
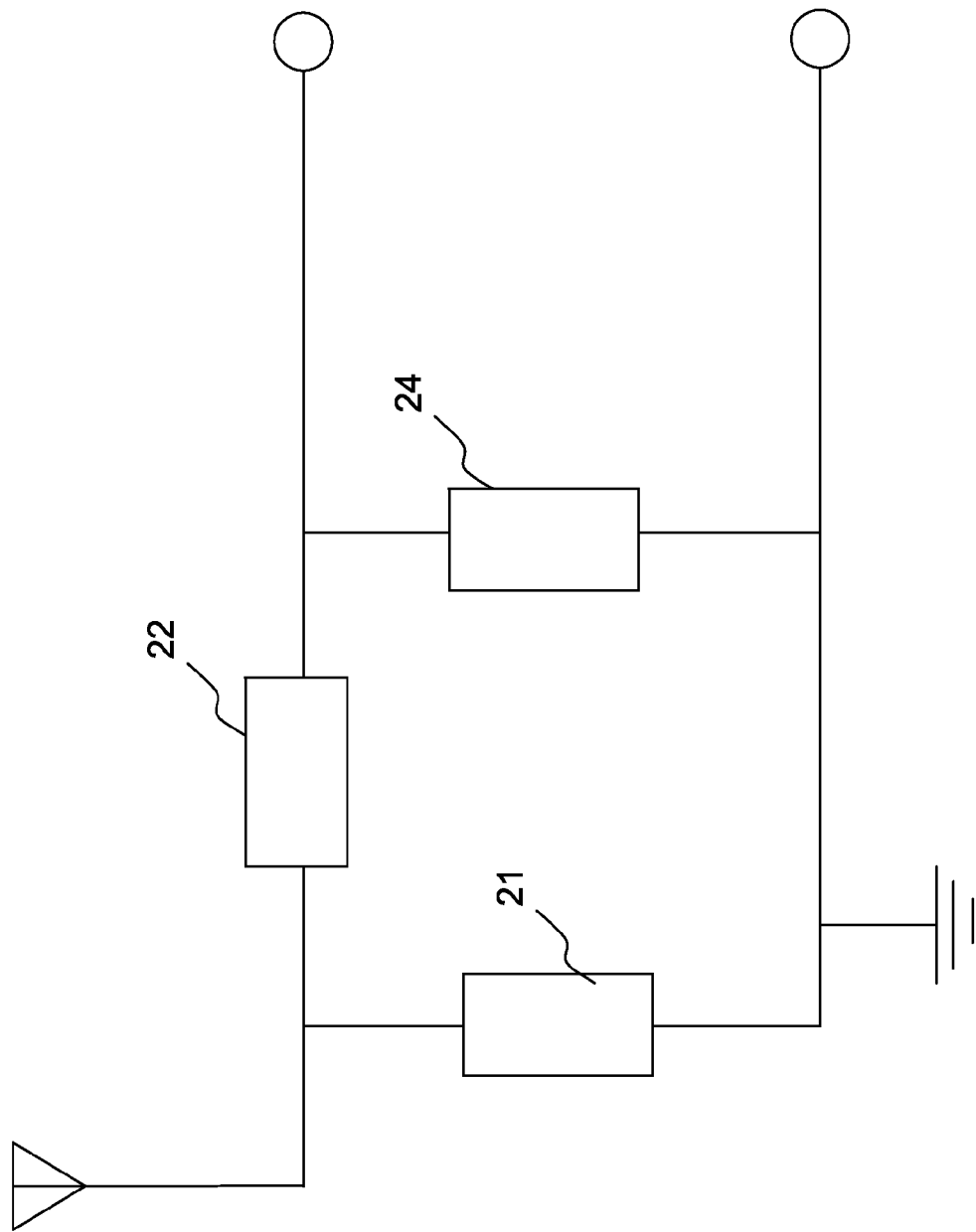
FIG. 2 and FIG. 3 are block diagrams schematically showing a cascade EMP protection circuit according to a second embodiment of the present invention, wherein impedance elements are respectively arranged at different positions.
Figure 3:
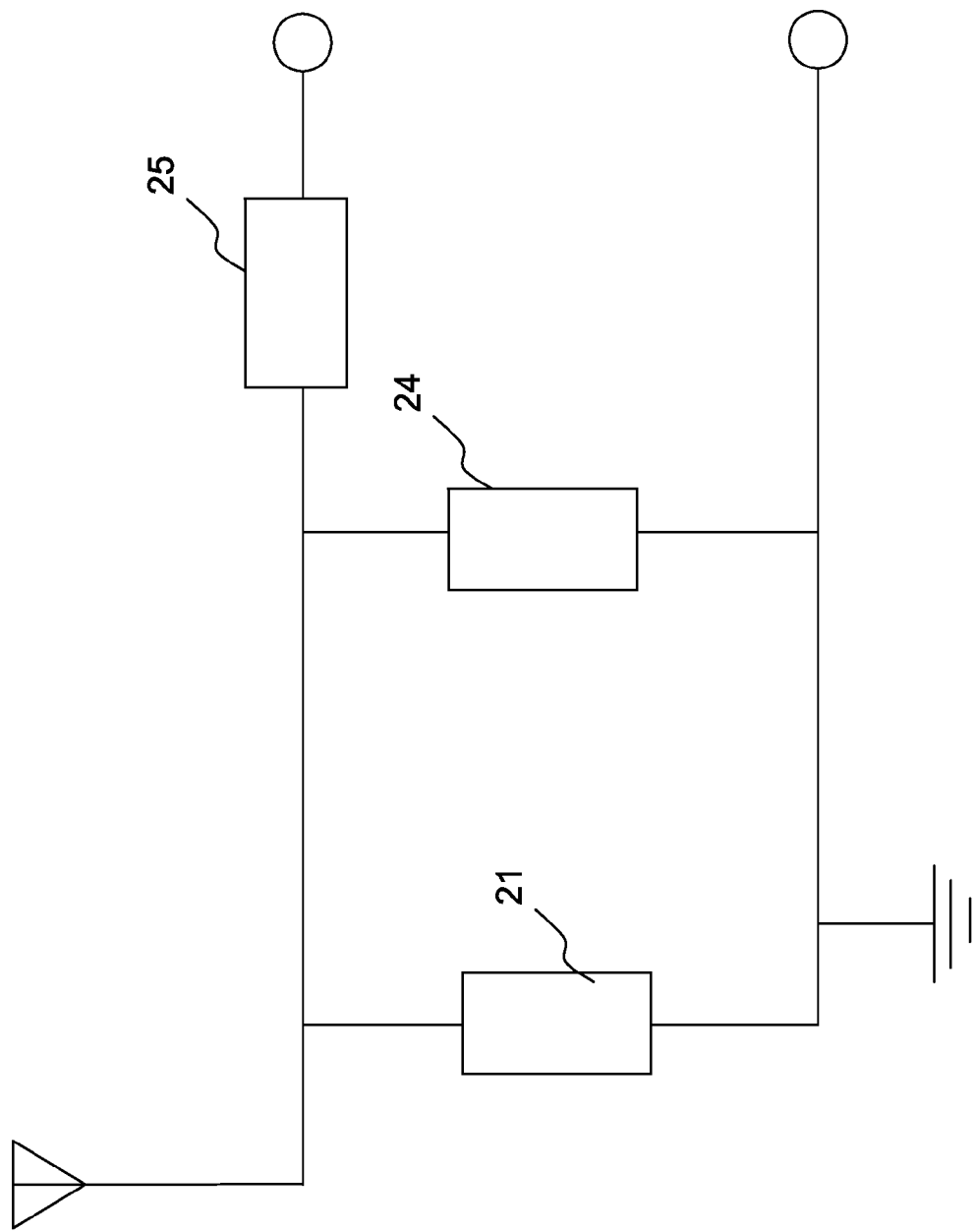

Refer to FIG. 2 for an EMP protection circuit according to a second embodiment of the present invention. In this embodiment, a high-pass protection inductor 24 and an LEMP protection element 21 are integrated by an impedance element 22. At high-frequency applications, the architecture of the original low-pass protection circuit is directly modified into a high-pass protection circuit. The high-pass protection inductor 24 of a high-frequency communication/information device directly adopts an inductor having an inductance less than 10 nH. As the spectrum of NEMP or LEMP is less than 300 MHz, a high-frequency communication/information device may directly adopt a small inductor, which can prevent from insertion loss. Then, the impedance element can be displaced to the front end, such as the impedance element 25 shown in FIG. 3. Alternatively, the impedance elements can be appropriately distributed on both sides of the high-pass protection inductor 24. When a surge appears, $V_L = L \times dI/dt$. The voltage generated by the inductive reactance will trigger the front-end slow-response LEMP protection element, and the impedance element 25 protects the rear-stage circuit.

Figure 4:
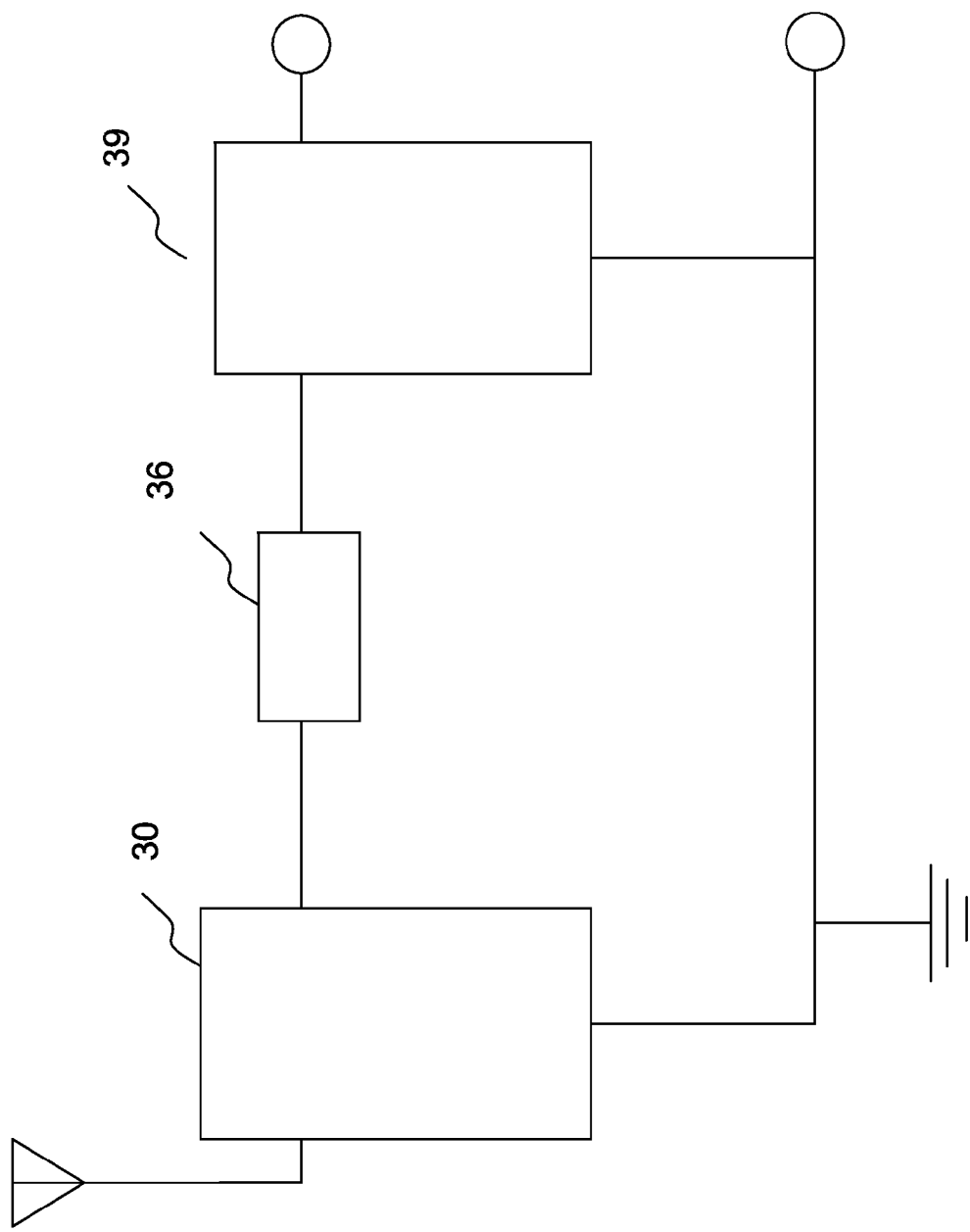
FIG. 4 is a block diagram schematically showing a cascade EMP protection circuit according to a third embodiment of the present invention.
Figure 6:
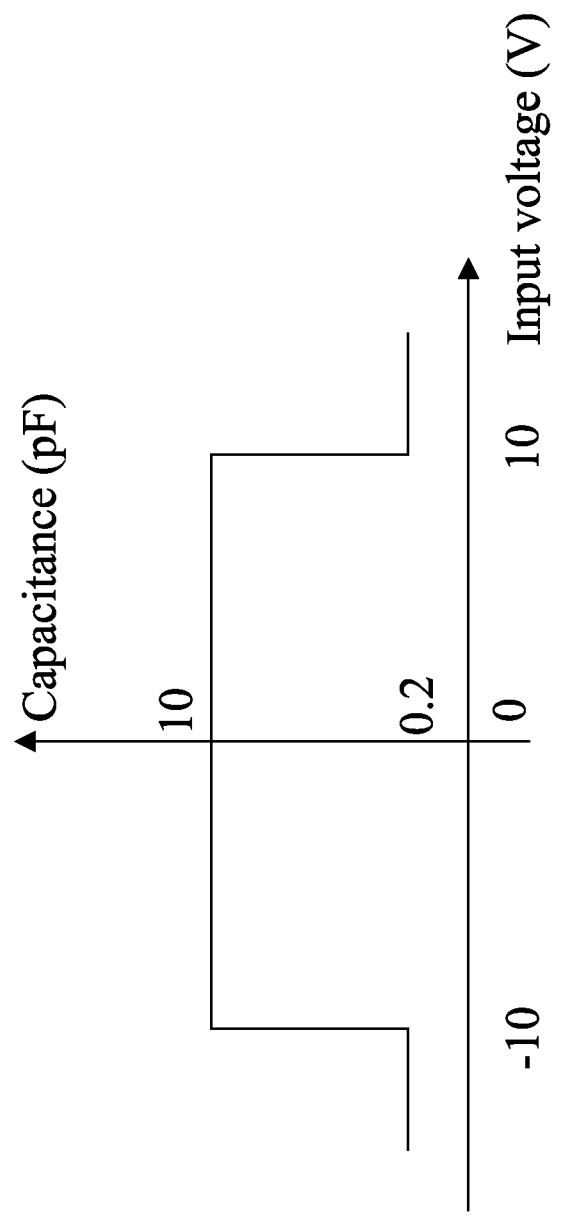
FIG. 6 is a diagram showing capacitance varying with input voltage of a varactor according to an embodiment of the present invention.

Refer to FIG. 4 for an EMP protection circuit according to a third embodiment of the present invention. In this embodiment, at least one capacitive reactance element 36 is arranged between and cascaded to a surge protection circuit 30 and a protected circuit 39. As shown in FIG. 6, the capacitive reactance element 36 is a voltage control varactor having a symmetrical capacitance with a zero voltage as a symmetric center point, wherein the symmetrical capacitance varies with the input voltage. The voltage control varactor has a symmetrical structure such as an MSM (Metal/Semiconductor/Metal) structure or an MISIM (Metal/Insulator/Semiconductor/Insulator/Metal) structure. The MSM structure or the MISIM structure generates a two dimension electron gas (2DEG) therein when the voltage control varactor receives a voltage. The energy gap of the MSM structure or the MISIM structure has large enough to result in the 2DEG. In a normal state, the voltage control varactor uses 2DEG to have a high symmetric capacitance and a low impedance, and signals can reach the communication system without distortion. For instance, the input voltage is between 10 V and −10 V, the voltage control varactor has the capacitance of 10 pF. When an intensive overvoltage EMP occurs, the voltage control varactor uses 2DEG to have a low capacitance and a high impedance, which impends signal coupling, lest the system be damaged. For instance, the input voltage is larger than 10 V or less than −10 V, the voltage control varactor has the capacitance of 0.2 pF.

In other words, the cascade EMP protection circuit of the present invention will fast trigger the protection circuit 30 firstly and utilizes the capacitive reactance element 36 to block a surge; thereby, the communication system can be free from the influence of EMP.

Those described above are only the embodiments to exemplify the present invention but not to limit the scope of the present invention. Any equivalent modification or variation according to the spirit of the present invention is to be also included within the scope of the claims stated below.

What is claimed is:

1. A cascade electromagnetic pulse protection circuit for high frequency application comprising:
    at least one voltage control varactor having symmetrical capacitance with a zero voltage as a symmetric center point, arranged between and cascaded to a surge protection circuit and a protected circuit, wherein the voltage control varactor has an MSM (Metal/Semiconductor/Metal) structure or an MISIM (Metal/Insulator/Semiconductor/Insulator/Metal) structure, and wherein when an intensive overvoltage EMP occurs, the MSM structure or the MISIM structure generates a two dimension electron gas (2DEG) therein whereby the voltage control varactor has a low capacitance and a high impedence, which impends signal coupling.

2. The cascade electromagnetic pulse protection circuit for high frequency application according to claim 1, wherein the surge protection circuit further comprises at least one stage of LEMP (Lightning Electromagnetic Pulse) protection circuit and more than one stage of fast-response protection circuit.

3. The cascade electromagnetic pulse protection circuit for high frequency application according to claim 2, wherein an impedance element is arranged between and parallel to the LEMP protection circuit and the fast-response protection circuit.

4. The cascade electromagnetic pulse protection circuit for high frequency application according to claim 2, wherein the fast-response protection circuit includes a plurality of cascaded ESD (Electrostatic Discharge) elements.

5. The cascade electromagnetic pulse protection circuit for high frequency application according to claim 2, wherein the fast-response protection circuit includes an ESD (Electrostatic Discharge) element and an inductive compensation element cascaded to the ESD element.

6. The cascade electromagnetic pulse protection circuit for high frequency application according to claim 2, wherein the fast-response protection circuit includes an inductive compensation element.

7. The cascade electromagnetic pulse protection circuit for high frequency application according to claim 2, wherein a fuse is cascaded to the LEMP protection circuit and the fast-response protection circuit.

8. The cascade electromagnetic pulse protection circuit for high frequency application according to claim 2, wherein an impedance element is cascaded to a front end of the LEMP protection circuit and the fast-response protection circuit.

* * * * *